United States Patent [19]
Schindler

[11] Patent Number: 6,014,199
[45] Date of Patent: Jan. 11, 2000

[54] CLASSIFYING FILM FRAMES BY SIZE

[75] Inventor: Hans-Georg Schindler, Holzkirchen, Germany

[73] Assignee: Agfa Gevaert AG, Leverkusen, Germany

[21] Appl. No.: 08/661,656

[22] Filed: Jun. 11, 1996

[30]  Foreign Application Priority Data

Jun. 12, 1995 [DE]  Germany ............................ 195 21 307

[51] Int. Cl.[7] ................................................... G03B 27/52
[52] U.S. Cl. .............................................. 355/40; 396/568
[58] Field of Search ................................. 355/40; 348/96;
356/443, 444; 396/567, 568, 569

[56]  References Cited

U.S. PATENT DOCUMENTS 4,279,502  7/1981  Thurm et al. .
4,792,830 12/1988  Matsumoto ................................. 355/55
5,289,229  2/1994  Manico et al. .
5,337,164  8/1994  Yabe et al. ................................ 358/487
5,596,415  1/1997  Cosgrove et al. ........................ 358/296

*Primary Examiner*—Safet Metjahic
*Assistant Examiner*—John Chizmar
*Attorney, Agent, or Firm*—Darby & Darby

[57]  ABSTRACT

A film containing first sections with narrower panoramic frames and second sections with wider normal frames is scanned to obtain density values. To distinguish the panoramic frames from the normal frames, the density values along two longitudinally extending strips near the edges of the film are checked for each film section. Each strip has a length equal to that of the respective frame, and the strips border the narrower panoramic frames but are located within the wider normal frames. The density distribution in each strip is compared with density distributions previously derived from the borders of panoramic frames.

24 Claims, 4 Drawing Sheets

CLASSIFYING FILM FRAMES BY SIZE

BACKGROUND OF THE INVENTION

The invention relates to the classification of pictures by size.

During photofinishing of an exposed and developed strip of film containing a series of frames or exposures, the frames are successively scanned pointwise by an optoelectronic scanner. The scanner yields density values which are used to print the frames on copy material or to reproduce the frames on another medium, e.g., a photo CD.

A strip of film sometimes has frames of different sizes. For instance, cameras capable of producing so-called panoramic views have recently come on the market. Although these cameras use conventional 135 mm film, portions of the film along the top and bottom longitudinal edges are covered during a panoramic exposure. The length of the resulting frame is the same as that for a normal, full-size frame but the length-to-width ratio is different. As a rule, panoramic frames are printed at a greater magnification than full-size frames. The magnification is such that the width of a panoramic picture equals the width of a conventional picture.

Magnification of a panoramic picture increases not only the width but also the length of the picture. In order to print the entire picture, it then becomes necessary to expose a greater length of copy material. Accordingly, a print of a panoramic picture has the usual width but a distinctly greater length. This yields a panoramic effect.

The recently introduced cameras for taking panoramic exposures are also able to selectively produce normal, full-size exposures. Hence, film exposed in such a camera can have a mixture of panoramic and full-size exposures.

During photofinishing of a film of this type, the frames need to be printed at different magnifications and with different lengths of copy material. This makes it necessary to automatically distinguish between panoramic frames and normal, full-size frames.

A method of distinguishing between panoramic and full-size frames is disclosed in U.S. Pat. No. 5,289,229. In this method, a frame is classified as panoramic when portions of the film adjoining the upper and lower edges have a substantially uniform density while the density in the central portion of the film varies. On the other hand, when the densities in the upper and lower portions of the film vary significantly, the corresponding frame is classified as a full-size frame.

In a camera capable of taking both panoramic and full-size pictures, it is frequently possible to make an exposure, e.g., of a date, in a portion of the film which is covered when a panoramic picture is taken. Consequently, a significant density difference exists in this portion of the film thereby causing a panoramic frame to be classified as a full-size frame.

In many of the cameras designed for panoramic as well as full-size pictures, the mask which covers the upper and lower portions of the film during a panoramic exposure has openings. Such openings can be formed, for example, by the tools employed in making the cameras. Again, the openings can result in exposures on the covered portions of the film thus causing improper classification of panoramic frames.

SUMMARY OF THE INVENTION

It is an object of the invention to provide a method which allows a picture or representation to be more reliably classified as to size.

Another object of the invention is to provide an apparatus which makes it possible to classify a picture or representation as to size with a higher degree of reliability.

The preceding objects, as well as others which will become apparent as the description proceeds, are achieved by the invention.

One aspect of the invention resides in a method of processing a selected section of material which carries a predetermined representation. The method comprises the steps of measuring a predetermined property, e.g., the density, of the selected section, establishing at least one empirical distribution of the property over a selected part of the selected section, and classifying the predetermined representation as to size. The classifying step includes comparing the empirical distribution with at least one predetermined distribution of the property derived from a source other than the selected section and corresponding to a predetermined representation size.

The method may also include the step of copying the predetermined representation based on the result of the classifying step.

The measuring step may involve scanning the selected section point-by-point. The scanning operation can be performed optoelectronically.

The selected part of the selected section may be located in a lateral portion of the selected section.

The classifying step may additionally include designating the predetermined representation as being of the predetermined size when the empirical distribution matches or approximately matches the predetermined distribution.

The selected section can be a member of a group which includes additional sections of material each carrying an additional representation. In such an event, the method may further comprise the steps of measuring the predetermined property for the additional sections, and establishing additional empirical distributions of the predetermined property over respective parts of the additional sections. All such parts, as well as the selected part of the selected section, have substantially the same relative positions in the respective sections, and the classifying step here includes comparing the empirical distribution for the selected section with the additional empirical distributions.

When the representations have different sizes, it is possible for sections which carry representations of a given size to have identical or approximately identical distributions of the predetermined property. Under such circumstances, the classifying step can involve designating the predetermined representation as being of the given size when the empirical distribution for the selected section matches or approximately matches a plurality of the additional empirical distributions.

The representations can constitute frames of a film, and one or more of the representations may be panoramic views of a first size while one or more of the representations can be larger non-panoramic views of a second size. It is preferred here for the predetermined distribution to correspond to the size of the panoramic views.

The step of establishing the empirical distribution for the selected section may comprise creating a grid with lighter and darker areas. The measuring step can involve determining values of the predetermined property at a plurality of locations of the selected part of the selected section. Each location corresponds to an area of the grid, and the grid is created by comparing each measured value of the predetermined property with a reference value. A location is classified as lighter or darker depending upon whether the corresponding value of the predetermined property is less or greater than the reference value.

If the representations constitute frames of a film, the predetermined property is preferably the density of the film. The film has a predetermined density when developed in unexposed condition, and the reference value for creating the grid can then equal the predetermined density plus an additional value. An area of the grid is classified as lighter when the density of the respective location is less than the reference value, and an area of the grid is classified as darker when the density of the respective location is greater than the reference value.

The method can further comprise the step of establishing an additional empirical distribution of the predetermined property over an additional part of the selected section. The classifying step then includes comparing the additional empirical distribution with the predetermined distribution.

Another aspect of the invention resides in an apparatus for processing a selected section of material which carries a representation. The apparatus comprises means for measuring a predetermined property of the selected section, and means for establishing an empirical distribution of the predetermined property over a selected part of the selected section. The apparatus additionally comprises means for comparing the empirical distribution with at least one predetermined distribution of the predetermined property derived from a source other than the selected section and corresponding to a predetermined representation size.

According to the invention, a section of material carrying a representation is measured and data obtained from a selected part of the section undergo a comparing operation. The data may be compared with a predetermined value either individually or together, e.g., by forming a sum. The representation is then classified in dependence upon the results of the comparison. The data can also be used to search for a specific distribution or structure, e.g., an exposure in a specific portion of the section of material. When a match for this distribution is found, the representation carried by the section of material can be unambiguously classified as to size.

Additional features and advantages of the invention will be forthcoming from the following detailed description of preferred embodiments when read in conjunction with the accompanying drawings.

DESCRIPTION OF THE PREFERRED EMBODIMENTS

Figure 1:
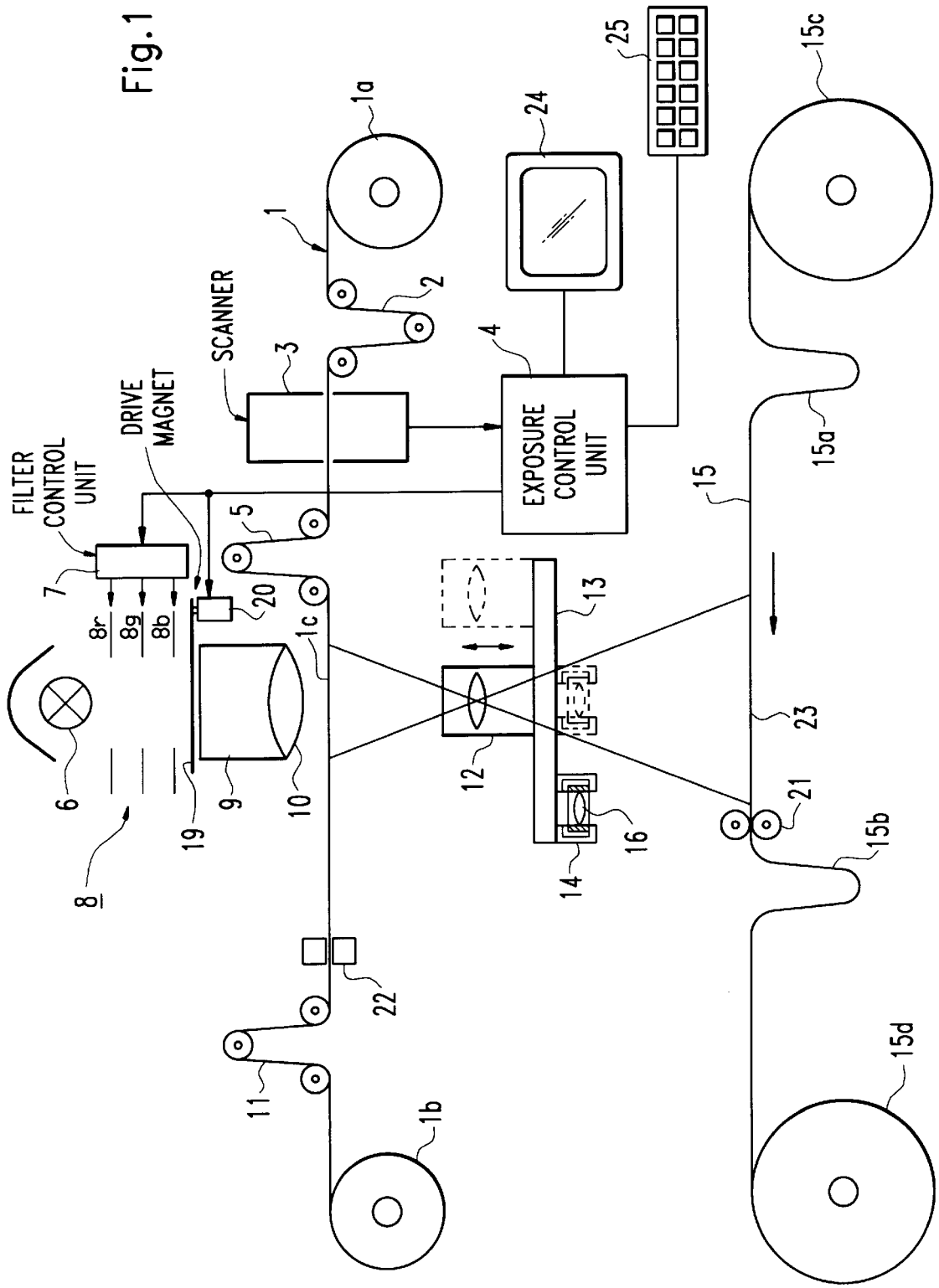
FIG. 1 schematically illustrates an apparatus in accordance with the invention for printing film.
Figure 2:
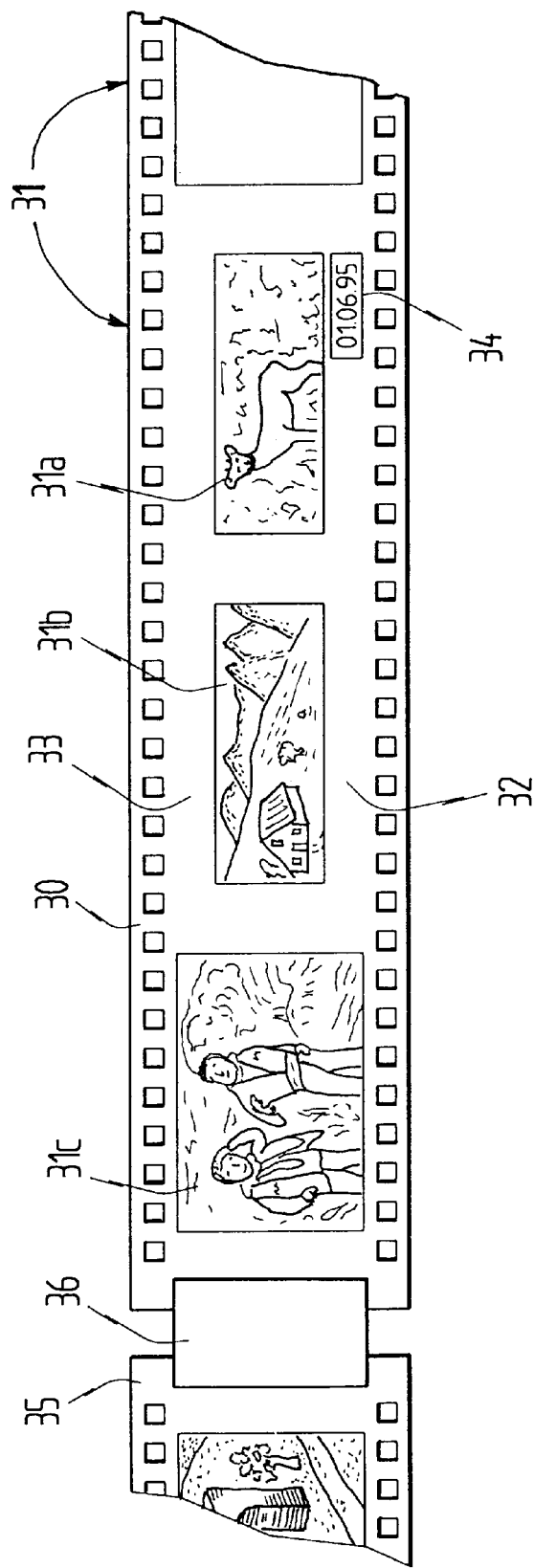
FIG. 2 shows a film segment with panoramic and full-size frames.

FIG. 1 schematically illustrates an apparatus for printing or copying film. The apparatus shown in FIG. 1 is a so-called roll printer or copier in which a very long band 1 consisting of individual films joined end-to-end is wound into a roll 1a on a supply reel. In FIG. 1, the supply reel is located on the right-hand side of the printer. The films have been exposed and developed, and each of the films includes a series of sections which respectively contain a picture or representation. The pictures or representations constitute frames of the films, and a segment of a film 30 with frames 31a, 31b and 31c is illustrated in FIG. 2.

The band 1 is unwound from the supply roll 1a and transported stepwise through the roll printer along a predetermined path by non-illustrated transporting rollers. In FIG. 1, the supply roll 1a is located on the right-hand side of the printer, and the direction of movement of the band 1 is from right to left. Upon reaching the end of the predetermined path, the band 1 is wound into a roll 1b on a take-up reel.

After being unwound from the supply roll 1a, the band 1 is guided through a decoupling loop 2 by a series of guide rollers. The band 1 then passes through a conventional scanner 3 where it is scanned point-by-point along columns and rows. Each point is scanned in the three primary colors red, green and blue to obtain the respective densities of the point in these colors. To this end, the scanner 3 is provided with optoelectronic scanning elements which are filtered to generate the three primary colors. The scanning elements may, for instance, be in the form of a linear or two-dimensional array of CCDs, or in the form of a linear array of diodes. The scanner 3 here operates at a resolution of 10×14 points.

The measurements or values obtained during scanning are sent to an exposure control unit 4. The exposure control unit 4 includes a central processing unit or CPU 41 shown in FIG. 3. The CPU 41 processes the density values from a multiplicity of film sections to derive density difference curves, that is, plots of the difference between two color densities, e.g., red density minus green density versus overall density. The density difference curves for any of the films of the band 1 are preferably calculated employing all of the measured density values for the respective film. The density difference curves are used to calculate the amount of printing or copying light for each film frame in each primary color taking into account the color errors related to density. Calculation of the density difference curves and the amounts of printing light can be carried out, for example, in accordance with the teachings of U.S. Pat. No. 4,279,502.

As can be seen in FIG. 2, the films of the band 1 have frames of different sizes. Thus, the frames 31a, 31b of the film 30 are smaller than the frame 31c. It is assumed here that the smaller frames 31a, 31b are panoramic frames while the frame 31c is a conventional full-size frame.

In addition to calculating the amounts of printing light, the CPU 41 calculates exposure parameters which are a function of frame size. Such parameters include the position, and hence the magnification factor, of a zoom lens or objective 12 in a printing or copying station of the printer; the position of a platform or stage, at a location 1c of the printing station, on which a film frame is supported during printing; and the position of a platform or stage, at a location 23 of the printing station, on which a segment of copy material or paper is supported during printing.

The CPU 41 further calculates an overall density for each image point, i.e., each point scanned by the scanner 3. The overall density is derived from the red, green and blue densities for the respective image point. If necessary, the overall densities of the image points can be displayed on a monitor 24 in the form of a picture. A keyboard 25 allows masking parameters to be entered in the exposure control unit 4.

The printing station is located downstream of the scanner 3 in the direction of travel of the band 1, and a storage loop 5 is disposed between the scanner 3 and the printing station.

The band 1 is guided through the loop by a series of guide rollers and then enters the printing station. The storage loop 5 is designed so that the leading frame of a film constituting part of the band 1 does not enter the printing station until the last frame of the film has been scanned by the scanner 3. To this end, the length of the storage loop 5 is approximately equal to the length of the individual films making up the band 1. The storage loop 5 allows all of the frames of a film to be evaluated before the leading frame is printed.

The printing station includes a light source 6 with an associated reflector which directs the light from the source 6 towards a filter arrangement 7,8. Downstream of the filter arrangement 7,8 in the direction of travel of the light is a shutter 19 which is operated by a drive magnet 20. The drive magnet 20 is regulated by the exposure control unit 4. A mixing shaft 9 follows the shutter 19, and a condenser 10 is situated at the downstream end of the mixing shaft 9. The condenser 10 directs the light from the source 6 onto a frame which is positioned at the location 1c of the printing station and is to be printed.

The films of the band 1 are here assumed to be negatives which transmit light. The light which travels through a frame at the location 1c is modulated by the picture in the frame, and the modulated light passes through the objective 12 which focuses the light on a segment of the copy material 15 positioned at the location 23. It has been mentioned previously that the objective 12 is a zoom objective and, as indicated by the double-headed arrow, the objective 12 is adjustable via a motor so as to change its focal length. This makes it possible to print frames of different width on copy material of a single width in such a manner that the copies all extend across the width of the copy material. Similarly, a given frame can be printed on copy materials of different width so that the copies extend across the widths of the respective copy materials. The focal length of the objective 12 can be adjusted steplessly or in steps.

The filter arrangement 7,8 includes a set 8 made up of three filters 8r, 8g and 8b having maximum absorptivity for red, green and blue light, respectively. The filters 8r, 8g, 8b can be moved partway into the path of the light from the source 6 by a filter control unit 7 also belonging to the filter arrangement 7,8. The filter control unit 7 is under the direction of the exposure control unit 4, and the amounts of red, green and blue printing light calculated by the exposure control unit 4 for the frames of the band 1 are converted into control signals for the filter control unit 7. When a frame at the location 1c is to be printed, the filters 8r, 8g, 8b are positioned in the light path so as to produce printing light of a specific color composition. The color composition is such that the portions of the frame important to the picture are reproduced with color neutrality. The exposure control unit 4 likewise regulates the total amount of printing light by way of the shutter 19 and its drive magnet 20.

Downstream of the printing station in the direction of travel of the band 1 is a sensor 22 for detecting the splices or joints between the individual films of the band 1. The sensor 22 detects a splice when the trailing end of a film passes by the sensor 22, and the sensor 22 then sends a signal to the exposure control unit 4. A loop 11 constituting a buffer for the band 1 is located behind the sensor 22. After travelling by the sensor 22, the band 1 is wound into the roll 1b.

The copy material or paper 15 is in the form of a long band, and unexposed copy material 15 is wound into a roll 15c on a supply reel. In FIG. 1, the supply roll 15c is disposed on the right-hand side of the printer and, as indicated by the arrow, the copy material 15 is unwound from the supply roll 15c and conveyed from right to left along a predetermined path by transporting rollers 21. Upon being unwound from the supply roll 15c, the copy material 15 passes through a storage loop 15a and then travels to the location 23 of the printing station. The location 23 is situated in line with the objective 12, and an unexposed segment of the copy material 15 is positioned at the location 23 and exposed during printing of a frame. After leaving the location 23, the copy material is transported through another loop 15b and thereafter wound into a roll 15d on a take-up reel.

The objective 12 is mounted on a primary guide 13 which extends across the light path and to either side thereof. A non-illustrated motor serves to move the objective 12 across the light path and, as illustrated by phantom lines, the objective 12 can be shifted right to a position out of the light path.

A secondary guide 14 is mounted on, and extends transverse to, the primary guide 13. The secondary guide 14, which is located at the left side of the primary guide 13 in FIG. 1, is shiftable along the primary guide 13 as denoted by the phantom line showing of the secondary guide 14 at the middle of the primary guide 13. A second objective 16 is supported on the secondary guide 14 and is movable stepwise transverse to the path of the copy material 15, e.g., via a toothed belt and a stepper motor.

The printer described above allows a wide variety of prints to be made from strips or bands of coherent frames. The prints can be produced on the same copy material and with no significant effect on printing speed. Moreover, a film containing both panoramic and normal, full-size frames can be processed.

The processing of a film with panoramic and full-size frames is accomplished as follows:

The scanner 3 detects the leading edge of the film by sensing the splice between this film and the preceding one. The scanner 3 then scans the film point-by-point over its entire length and width. The density values obtained by the scanner 3 are used to calculate the optimal amounts of red, green and blue light for each frame of the film. The calculations are performed by the exposure control unit 4 in accordance with the teachings of U.S. Pat. No. 4,279,502.

Furthermore, the density values derived from the scanner 3 make it possible to determine the positions of the leading and trailing edges of the frames. This information is necessary to properly position the frames in the printing station if the frames have not been marked by notching the film. By additional evaluation of the density values, a determination can be made as to whether a frame is a panoramic frame or a full-size frame.

FIG. 2 shows a segment of the film 30 as mentioned earlier and also shows a segment of a second film 35. The films 30,35, both of which constitute part of the band 1, are connected end-to-end by a splice or joint 36. Each of the films 30,35 can, for instance, have 24 or 36 frames.

Each of the films 30,35 includes a group of sections 31 which are arranged in a row along the length of the respective film 30,35. Each of the sections 31, in turn, comprises a frame of the film. The two panoramic frames 31a, 31b, and the normal, full-size frame 31c, of the film 30 are representative of the frames found in the films of the band 1. By way of example, the panoramic frames 31a, 31b can have dimensions of about 13 mm×36 mm. However, the invention can be used to process panoramic frames of different dimensions, e.g., different width.

Each section 31 of the film 30 has two lateral portions or parts 32 and 33 which extend longitudinally of the film 30 and bound at least part of the respective frame on opposite sides. In the section 31 containing the full-size frame 31c, the lateral portions 32,33 form part of the frame 31c. On the other hand, in the sections 31 containing the panoramic frames 31a and 31b, the lateral portions 32,33 are disposed externally of, and border, the frames 31a, 31b. The lateral portions 32,33 bordering the frame 31b are transparent in their entirety, that is, the lateral portions 32,33 which border the frame 31b constitute portions of the film 30 which were developed without being exposed. The lateral portion 33 bordering the frame 31a is likewise transparent throughout while the lateral portion 32 which borders the frame 31a is provided with an exposure 34. The exposure 34 is here a date.

When a film section 31 is darkened only in the middle along the normal length of such section and the lateral portions 32,33 are completely transparent, it is very easy to determine that the film section 31 contains a panoramic frame. This is the case for the film section 31 with the frame 31b. On the other hand, if an exposure is present in a lateral portion as is the situation for the film section 31 with the frame 31a, automatic identification of the frame as a panoramic frame becomes difficult. Nevertheless, the invention enables such identification to be made reliably.

Once a selected film has been completely scanned by the scanner 3 and the frames have been classified as to size, the locations of the selected film occupied by panoramic and full-size frames are known. If, for example, the film preceding the selected film exited the printing station with the printer set for the printing of full-size frames, the components 12,13,14 of the printing station are positioned in such a manner that a copy of a full-size frame extends across the width of the copy material 15. Moreover, the transporting rollers for the band 1 are programmed to advance the band 1 in steps having the length of a full-size frame so that, upon activation of the transporting rollers and corresponding movement of the band 1, a full-size frame is brought into the printing station and copied.

Figure 3:
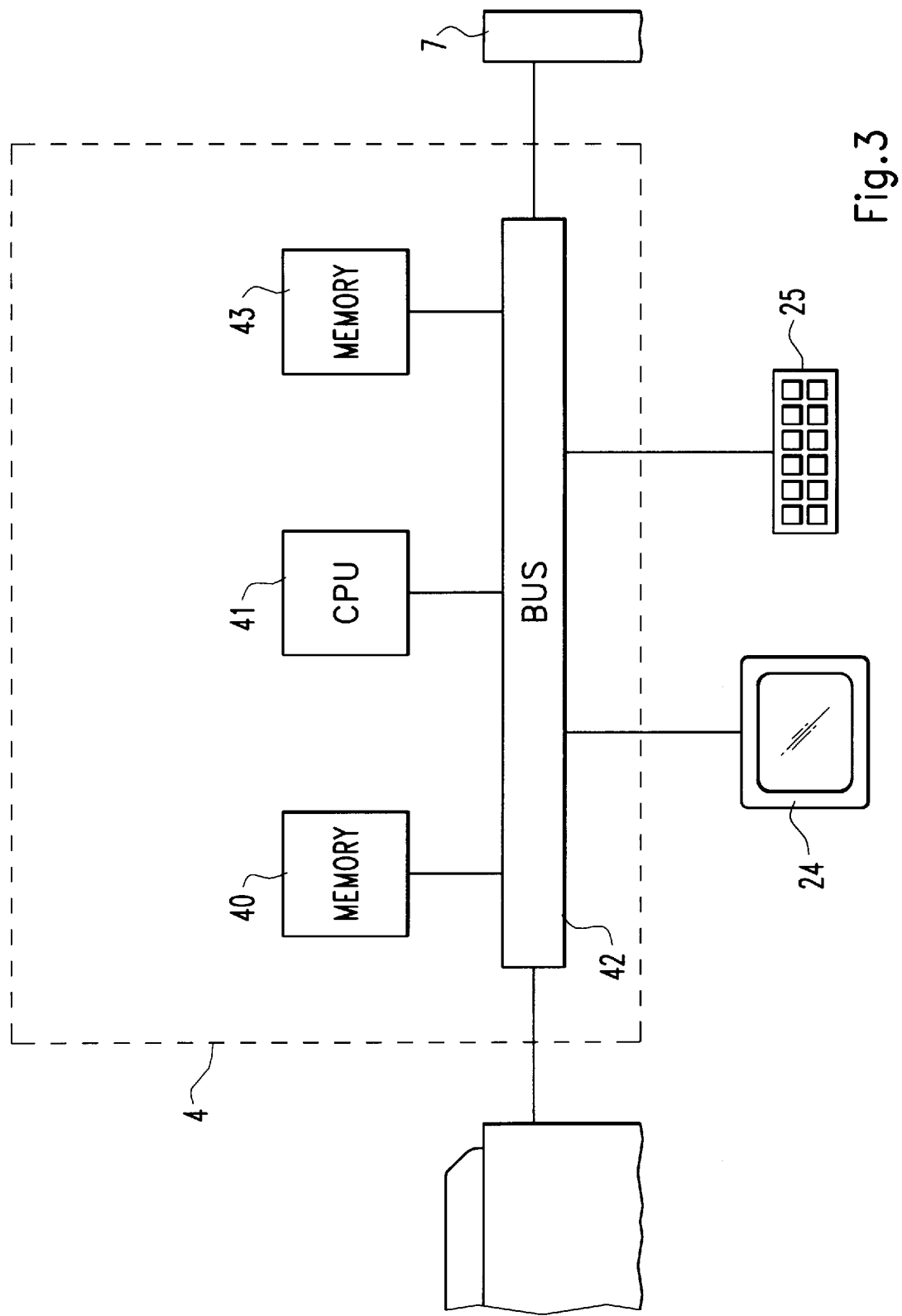
FIG. 3 illustrates components of a control unit forming part of the apparatus of FIG. 1.

With reference to FIG. 3, the exposure control unit 4 includes, in addition to the CPU 41, a memory 40 for the density values obtained by the scanner 3, a second memory 43, and a bus 42. The bus 42 connects the CPU 41 and the memories 40,43 to the components 3,7,12,14,16,20,24,25 of the printer.

Figure 4:
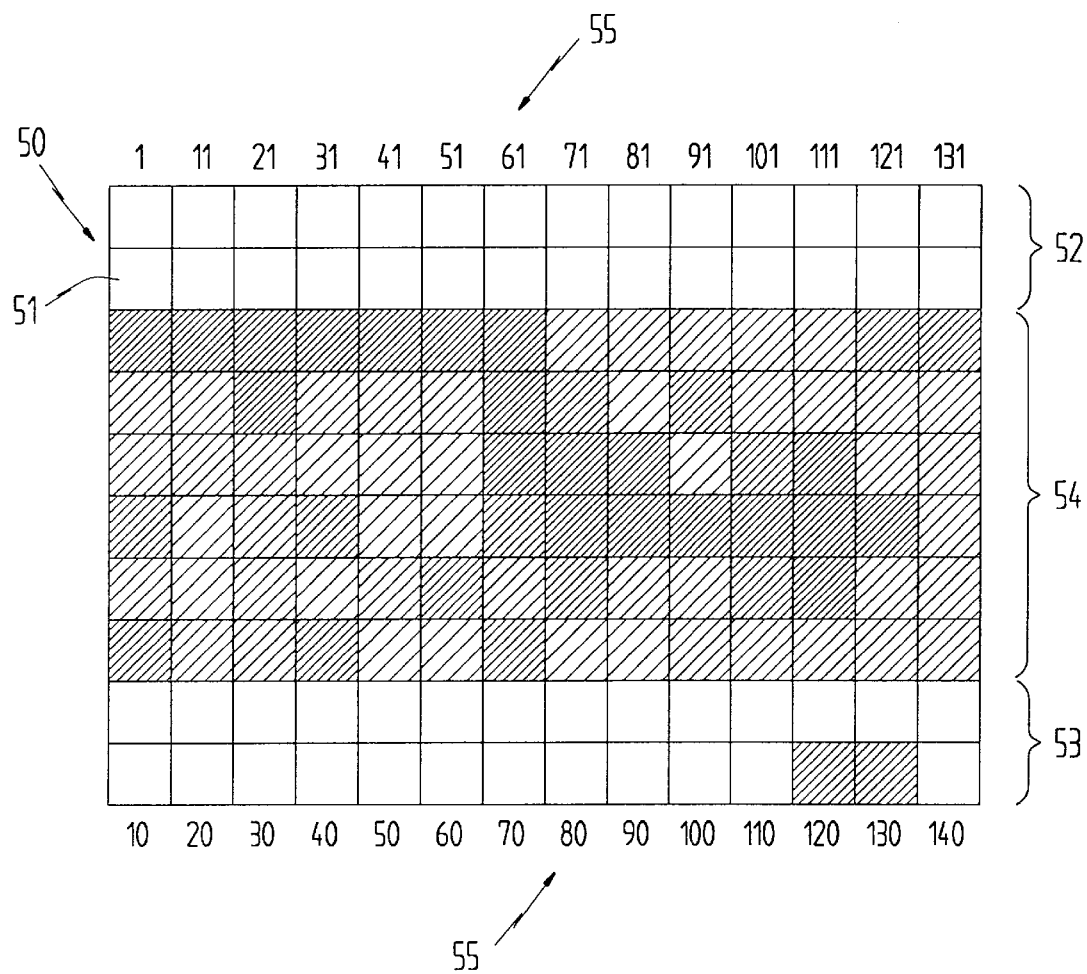
FIG. 4 shows a grid pattern obtained from a scan of a section of film containing a panoramic frame.

FIG. 4 shows a grid or raster 50 established by the scanner 3. The grid 50 has 140 boxes or squares 51 in accordance with the 10×14 resolution of the scanner 3. Each of the boxes 51 represents an image point or pixel of a film section 31. The boxes 51 are arranged in columns and rows, and each of the boxes 51 is assigned a respective number 55 from 1 to 140. The grid numbers 55 increase down the columns and from left to right along the rows. Thus, in the left-hand column, the grid numbers 55 increase progressively from 1 to 10; in the second column from the left, the grid numbers 55 increase progressively from 11 to 20; and so on.

The two uppermost rows define an upper marginal portion 52 of the grid 50 which, for a film section 31 containing a panoramic frame, normally corresponds to an unexposed portion of the film section 31. The two lowermost rows, on the other hand, define a lower marginal portion 53 of the grid 50. The marginal portions 52,53 correspond approximately to the lateral portions or parts 32,33 of a film section 31. The remaining rows define an intermediate portion 54 of the grid 50 which, for a film section 31 with a panoramic frame, represents such frame.

The density values of a film section 31, with the grid 50 and its numbers 55 superimposed, can be displayed on the monitor 24.

To reliably identify a panoramic frame, the marginal portions 52,53 corresponding to each film section 31 are systematically examined. This can be accomplished on the monitor 24 by an operator or automatically in the exposure control unit 4. For a film section 31 containing a panoramic frame, all of the image points represented by the marginal portions 52,53 are normally expected to be transparent, i.e., unexposed. The densities of such points satisfy the condition:

D less than or equal to Dm+d where:

D is the density of an image point,

Dm is the mask density, that is, the density of an unexposed portion of the film, and d is a predetermined value, e.g., 0.1.

Image points which satisfy this condition are represented by white boxes 51 in the grid 50.

In many film sections 31 containing a panoramic frame, one or more image points corresponding to the marginal portions 52,53 have a density such that:

D greater than Dm+d. This is the case, for instance, when a lateral portion 32,33 of a film section 31 with a panoramic frame is provided with an exposure like the exposure 34 adjacent the panoramic frame 31a. Under these circumstances, a panoramic frame can is no longer readily distinguishable from a full-size frame.

Image points for which the preceding relationship holds true are represented by darkened boxes 51 in the grid 50.

Exposures such as the exposure 34 can result from the insertion of user data on a film or from openings in the mask employed by a camera when taking a panoramic picture. Openings can be formed in a mask by the tools used during production.

A film is normally exposed in one camera. It can thus be assumed that, within a given film, all of the film sections 31 with panoramic frames have essentially the same exposure pattern, i.e., the same predetermined structure, in the lateral portions 32,33 corresponding to the marginal portions 52,53 of the grid 50. This makes it possible, for positive identification of the panoramic frames, to isolate those boxes 51 of the marginal portions 52,53 which correspond to exposures specific to the camera. The isolated boxes 51 are treated separately from, and evaluated with different criteria, than the remaining boxes 51 of the marginal portions 52,53.

When an operator examines a film section 31 on the monitor 34, the operator can enter in the exposure control unit 4 the grid numbers 55 which clearly correspond to an area of the film section 31 having exposures specific to the camera. For the grid 50, the operator would enter 120 and 130. The grid numbers 55 entered by the operator are stored in the memory 43, which constitutes a library, as masking grids, i.e., grid patterns or structures. By entering the grid numbers 55 from films exposed in different cameras, the library memory 43 may be loaded with a variety of masking grids corresponding to many different types of cameras. The direction of travel of a film, that is, first frame first or last frame first, is to be taken into consideration.

The masking grids stored in the library memory 43 can be used during automatic operation of the printer to reliably and automatically identify panoramic frames. To increase the certainty of correct identification, evaluation of the masking grids can be performed taking color into account. By way of example, this allows desired LED exposures to be reliably differentiated from other exposures.

A film is automatically analyzed in the following manner:

Each film section 31 of the film is scanned point-by-point via the scanner 3 and the boxes 51 of the respective marginal portions 52,53 examined. The grid number 55 for every such box 51 is then checked against the information on the masking grids in the memory 43. The information can indicate that the image point corresponding to a particular grid number 55 is to be disregarded in evaluation of the film because it lies in an exposure specific to a camera, i.e., because the density of the image point is:

D greater than Dm+d. All other image points corresponding to the respective marginal portions 52,53 must satisfy the condition:

D less than Dm+d.

The memory 43 contains a variety of masking grids corresponding to the different locations at which exposures specific to various cameras are produced. In one masking grid RM0, all image points corresponding to the marginal portions 52,53 have the following density D less than Dm+d. Other masking grids RM1, RM2, RM3 and RM4 contain data which indicate that, although specific image points may satisfy the relationship:

D greater than Dm+d, the corresponding frame is nevertheless to be classified as a panoramic frame. By way of example, the masking grid RM1 may indicate that the image points corresponding to box numbers 120 and 130 of the grid 50 may satisfy this relationship; the masking grid RM2 may indicate that the image points corresponding to box numbers 10 and 20 may satisfy this relationship; the masking grid RM3 may indicate that the image points corresponding to box numbers 70 and 80 may satisfy this relationship; and the masking grid RM4 may indicate that the image point corresponding to box number 90 may satisfy this relationship.

The data contained in the masking grids RM1,RM2,RM3, RM4 may, for instance, further indicate that the density values for a particular image point are not to undergo a comparison, i.e., that the number of image points to be evaluated represents only a fraction of the number of boxes 51 in the respective marginal portions 52,53.

The density values for the lateral portions 32,33 of a film are compared with the masking grids in the memory 43 one after the other. A film section 31 potentially contains a panoramic frame when the respective density values are at least substantially within the boundary values established by a masking grid. The number of panoramic frames identified in a film by each masking grid is determined.

The masking grid which identifies the greatest number of panoramic frames in a film is used to establish the parameters for printing of the panoramic frames. Among others, these parameters include the magnification, the position of the frame in the printing station, and the position of the segment of copy material to be exposed.

Alternatively to, or in combination with, the procedure described above, it is possible to examine the "coincidence" of the density values for corresponding image points of different film sections 31 of the same film. For two film sections 31, the data in the boxes 51 of one or both marginal portions 52,53 are compared to determine whether the data for the respective film sections 31 are in agreement. The film sections 31 are considered to be "coincident" when the image points which are associated with one film section 31 and satisfy the relationship:

D less than or equal to Dm+d constitute a substantial fraction, preferably at least one-half, of the image points of the other film section 31.

To distinguish panoramic frames from full-size frames with a sufficient degree of reliability, the number of image points which are associated with the marginal portions 52,53 and are evaluated should be distinctly smaller than the total number of image points corresponding to the marginal portions 52,53.

The validity of a selected masking grid, other than the null masking grid RM0, is determined by checking whether the number of panoramic frames identified by the selected masking grid significantly exceeds the number of panoramic frames identified by the null masking grid. If the number of panoramic frames identified is the same for two or more masking grids, excluding the null masking grid, then those frames identified by the null masking grid are advantageously classified as panoramic frames.

Various modifications are possible within the meaning and range of equivalence of the appended claims. For instance, the number of points scanned by the scanner 3 can be increased thereby increasing the degree of reliability with which panoramic frames are identified.

I claim:

1. A method of processing at least one section of material which carries a predetermined representation, said method comprising the steps of measuring a property of said one section, said one section being a member of a group which includes additional sections of material each carrying an additional representation; establishing at least one empirical distribution of said property over at least one part of said one section; and classifying said predetermined representation as to size by comparing said one empirical distribution with at least one predetermined distribution of said property derived from a source other than said one section and corresponding to a predetermined representation size; measuring said property for said additional sections; and establishing additional empirical distributions of said property over respective parts of said additional sections, all of said parts having substantially the same relative positions in the respective sections, and said classifying step including comparing said one empirical distribution with said additional empirical distributions.

2. The method of claim 1, further comprising the step of establishing an additional empirical distribution of said property over an additional part of said one section; and wherein the classifying step includes comparing said additional empirical distribution with said one predetermined distribution.

3. The method of claim 1, wherein said one section has a lateral portion and said one part is located in said lateral portion.

4. The method of claim 1, wherein the classifying step further includes designating said predetermined representation as being of said predetermined size when said one empirical distribution is identical or approximately identical to said one predetermined distribution.

5. The method of claim 1, wherein said representations have different sizes and the empirical distributions for sections carrying representations of one of said sizes are identical or approximately identical, the classifying step further including designating said predetermined representation as being of said one size when said one empirical distribution is identical or approximately identical to a plurality of said additional empirical distributions.

6. The method of claim 1, wherein the measuring step comprises scanning said one part point-by-point.

7. The method of claim 6, wherein the scanning step is performed optoelectronically.

8. The method of claim 1, wherein said property is the density of said one section.

9. The method of claim 1, wherein said one section is a member of a group which includes additional sections of material each carrying an additional representation, said representations constituting frames of a film, and at least one of said representations being a panoramic view while at least one other of said representations is a larger non-panoramic view.

10. The method of claim 9, wherein said one predetermined distribution corresponds to the size of said panoramic view.

11. The method of claim 1, wherein the step of establishing said one empirical distribution comprises creating a grid with lighter and darker areas.

12. The method of claim 11, wherein the measuring step comprises determining values of said property at a plurality of locations of said one part each of which corresponds to an area of said grid, said grid being created by comparing each of said values with a reference value, and classifying the respective location as lighter or darker depending upon whether the corresponding value of said property is smaller or greater than said reference value.

13. The method of claim 12, wherein said predetermined representation constitutes a frame of a film having a predetermined density when developed in unexposed condition, said property being the density of said one section, and said reference value equalling said predetermined density plus an additional value, an area of said grid being classified as lighter when the density of the respective location is less than said reference value, and an area of said grid being classified as darker when the density of the respective location is greater than said reference value.

14. The method of claim 1, further comprising the step of copying said one section based on the result of the classifying step.

15. An apparatus for processing at least one section of material which carries a predetermined representation, said apparatus comprising means for measuring a property of said one section; and means for establishing at least one empirical distribution of said property over at least one part of said one section, and for comparing said one empirical distribution with at least one predetermined distribution of said property derived from a source other than said one section and corresponding to a predetermined representation size, said apparatus for use when: (i) said one section is a member of a group which includes additional sections of material each carrying an additional representation, (ii) said representations have different sizes, and (iii) sections carrying representations of one of said sizes yield essentially identical empirical distributions of said property when corresponding parts of said sections are measured by said measuring means, wherein said establishing and comparing means comprises means for classifying said predetermined representation as being of said one size when said one empirical distribution is identical or approximately identical to the empirical distributions of a plurality of said additional sections.

16. The apparatus of claim 15, wherein said establishing and comparing means comprises a memory containing said one predetermined distribution.

17. The apparatus of claim 15, wherein said measuring means comprises means for scanning point-by-point.

18. The apparatus of claim 17, wherein said scanning means comprises an optoelectronic scanner.

19. The apparatus of claim 15, further comprising means for copying said one section based on data from said comparing means.

20. The apparatus of claim 15 for use when: (i) said one section is a member of a group which includes additional sections of material each carrying an additional representation, and (ii) said representations constitute frames of a film, wherein said property is, and said measuring means comprises means for determining, the density of said film.

21. The apparatus of claim 20 for use when: (i) at least one of said representations is a panoramic view, and (ii) at least one other of said representations is a larger non-panoramic view, wherein said one predetermined distribution corresponds to the size of said panoramic view.

22. The apparatus of claim 15, wherein said establishing and comparing means comprises means for classifying said predetermined representation as being of said predetermined size when said one empirical distribution is identical or approximately identical to said one predetermined distribution.

23. The apparatus of claim 15, wherein said establishing and comparing means comprises a first memory containing said one predetermined distribution, and a second memory for data from said measuring means.

24. The apparatus of claim 15, wherein said establishing and comparing means comprises a memory containing said one predetermined distribution; and further comprising means for entering additional distributions in said memory.

* * * * *